US012205456B1

(12) United States Patent
White et al.

(10) Patent No.: US 12,205,456 B1
(45) Date of Patent: Jan. 21, 2025

(54) AUTOMATIC VEHICLE ACCIDENT NOTIFICATIONS WITHIN A DISTRIBUTED NETWORK OF RECIPIENTS

(71) Applicant: UIPCO, LLC, San Antonio, TX (US)

(72) Inventors: Angelica Nichole White, Spring Branch, TX (US); Sean Carl Mitchem, San Antonio, TX (US); Sean Michael Wayne Craig, San Antonio, TX (US); Subhalakshmi Selvam, Allen, TX (US); Christopher Russell, The Colony, TX (US); Brian Howard Katz, San Antonio, TX (US); Roberto Virgillio Jolliffe, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/683,428

(22) Filed: Mar. 1, 2022

(51) Int. Cl.
*G08B 25/00* (2006.01)
*G07C 5/00* (2006.01)
(Continued)

(52) U.S. Cl.
CPC ........... *G08B 25/006* (2013.01); *G07C 5/008* (2013.01); *G08G 1/0965* (2013.01); *G08G 1/162* (2013.01)

(58) Field of Classification Search
None
See application file for complete search history.

(56) References Cited

U.S. PATENT DOCUMENTS 6,853,849 B1 * 2/2005 Tognazzini ........... B60W 40/04 455/457
8,160,764 B2 * 4/2012 Choi ...................... G08G 1/205 701/25
(Continued)

FOREIGN PATENT DOCUMENTS

DE 102015209853 A1 12/2016
JP 2010182287 A 8/2010
(Continued)

OTHER PUBLICATIONS

Chong et al., "Traffic accident data mining using machine learning paradigms." Fourth International Conference on Intelligent Systems Design and Applications (ISDA'04), Hungary. 2004. (Year: 2004).
(Continued)

*Primary Examiner* — Muhammad Adnan
(74) *Attorney, Agent, or Firm* — Potomac Law Group, PLLC; Dannon G. Allbee

(57) ABSTRACT

Methods and systems described herein are directed to automatedly generating entity-specific notifications of a vehicle accident occurrence for entities. In response to a notification system receiving accident data, the system can determine characteristics for the accident occurrence. Using these characteristics, the system can then determine parameters for the notifications defining types of entities which ought to be recipients in accordance with the characteristics. The system can use these parameters to locate specific entities that match the parameters. Having determined the entities, the system can issue notifications to the entities, using templates specific to the entities and with accident characteristics added.

16 Claims, 8 Drawing Sheets

(51) Int. Cl.
*G08G 1/0965* (2006.01)
*G08G 1/16* (2006.01)

(56) References Cited

U.S. PATENT DOCUMENTS

| | | | | |
|---|---|---|---|---|
| 8,731,977 | B1 * | 5/2014 | Hardin | G06Q 40/08 705/26.1 |
| 9,196,159 | B1 * | 11/2015 | Kerr | G08G 1/096716 |
| 9,773,281 | B1 | 9/2017 | Hanson | |
| 9,786,154 | B1 * | 10/2017 | Potter | G08B 21/02 |
| 9,886,841 | B1 * | 2/2018 | Nave | B60W 50/14 |
| 10,086,782 | B1 * | 10/2018 | Konrardy | G01B 21/00 |
| 10,106,156 | B1 * | 10/2018 | Nave | G08G 1/16 |
| 10,165,429 | B1 | 12/2018 | Young et al. | |
| 10,360,742 | B1 | 7/2019 | Bellas et al. | |
| 10,580,306 | B1 * | 3/2020 | Harris | G01C 21/3492 |
| 10,586,122 | B1 * | 3/2020 | Gingrich | G06V 10/768 |
| 10,660,806 | B1 * | 5/2020 | Nelson-Herron | G16H 80/00 |
| 10,692,149 | B1 * | 6/2020 | Loo | G06Q 40/08 |
| 10,769,456 | B2 | 9/2020 | Sathyanarayana et al. | |
| 10,789,650 | B1 * | 9/2020 | Nave | B60W 10/04 |
| 10,803,527 | B1 | 10/2020 | Zankat et al. | |
| 10,853,882 | B1 * | 12/2020 | Leise | G06T 5/50 |
| 10,867,495 | B1 * | 12/2020 | Venetianer | G08B 13/19671 |
| 11,379,886 | B1 * | 7/2022 | Fields | G06Q 30/0278 |
| 11,503,153 | B1 | 11/2022 | Hansen et al. | |
| 11,620,862 | B1 | 4/2023 | Serrao et al. | |
| 11,669,590 | B2 | 6/2023 | Hyland et al. | |
| 11,679,763 | B2 * | 6/2023 | Nagasawa | G08G 1/162 701/301 |
| 11,692,838 | B1 | 7/2023 | Gibson et al. | |
| 11,735,050 | B2 * | 8/2023 | Garg | G08G 1/164 701/32.2 |
| 11,781,883 | B1 * | 10/2023 | Dabell | G01C 21/3874 701/409 |
| 2011/0117878 | A1 * | 5/2011 | Barash | H04W 4/12 340/539.12 |
| 2014/0379523 | A1 * | 12/2014 | Park | G06Q 30/0609 705/26.35 |
| 2015/0084757 | A1 * | 3/2015 | Annibale | H04W 4/90 340/436 |
| 2015/0145695 | A1 | 5/2015 | Hyde et al. | |
| 2016/0009279 | A1 | 1/2016 | Jimaa et al. | |
| 2016/0169688 | A1 * | 6/2016 | Kweon | G08G 1/096741 701/522 |
| 2017/0053461 | A1 * | 2/2017 | Pal | G08G 1/012 |
| 2017/0072850 | A1 | 3/2017 | Curtis et al. | |
| 2017/0213462 | A1 * | 7/2017 | Prokhorov | G08G 1/166 |
| 2017/0248949 | A1 * | 8/2017 | Moran | G08G 1/165 |
| 2017/0248950 | A1 * | 8/2017 | Moran | G08G 1/165 |
| 2018/0061253 | A1 | 3/2018 | Hyun | |
| 2018/0286248 | A1 * | 10/2018 | Choi | G08G 1/166 |
| 2018/0293864 | A1 * | 10/2018 | Wedig | G08B 25/08 |
| 2018/0297593 | A1 * | 10/2018 | Pitale | G08G 1/166 |
| 2018/0300964 | A1 * | 10/2018 | Lakshamanan | G06F 9/5027 |
| 2018/0308342 | A1 * | 10/2018 | Hodge | G08B 25/014 |
| 2018/0308344 | A1 * | 10/2018 | Ravindranath | G08B 27/001 |
| 2018/0364722 | A1 * | 12/2018 | Schlesinger | G08G 1/0112 |
| 2019/0095877 | A1 | 3/2019 | Li | |
| 2019/0174289 | A1 * | 6/2019 | Martin | H04W 4/90 |
| 2019/0202448 | A1 * | 7/2019 | Pal | H04W 4/029 |
| 2019/0253861 | A1 * | 8/2019 | Horelik | H04W 76/50 |
| 2019/0327597 | A1 * | 10/2019 | Katz | H04M 3/5116 |
| 2019/0385457 | A1 * | 12/2019 | Kim | G08G 1/167 |
| 2020/0043097 | A1 | 2/2020 | Aznaurashvili et al. | |
| 2020/0059776 | A1 * | 2/2020 | Martin | G06F 3/04817 |
| 2020/0105120 | A1 * | 4/2020 | Werner | G08B 25/006 |
| 2020/0274962 | A1 * | 8/2020 | Martin | H04W 4/90 |
| 2020/0312046 | A1 * | 10/2020 | Righi | G07C 5/008 |
| 2021/0023946 | A1 | 1/2021 | Johnson et al. | |
| 2021/0027409 | A1 * | 1/2021 | Nair | G10L 15/08 |
| 2021/0061209 | A1 * | 3/2021 | Park | G08B 25/016 |
| 2021/0217120 | A1 * | 7/2021 | Del Forn | G06F 40/279 |
| 2021/0219257 | A1 * | 7/2021 | Anand | H04W 64/003 |
| 2021/0225155 | A1 | 7/2021 | Potter et al. | |
| 2021/0256257 | A1 * | 8/2021 | Taccari | G06N 3/08 |
| 2021/0304593 | A1 | 9/2021 | Matus et al. | |
| 2022/0044024 | A1 | 2/2022 | Sambo et al. | |
| 2022/0058701 | A1 * | 2/2022 | Fuchs | G07C 5/008 |
| 2022/0063609 | A1 * | 3/2022 | Nagasawa | G08G 1/205 |
| 2022/0095975 | A1 | 3/2022 | Aluf et al. | |
| 2022/0169175 | A1 * | 6/2022 | Choi | H04L 1/20 |
| 2022/0321343 | A1 * | 10/2022 | Bahrami | H04W 12/033 |
| 2022/0383256 | A1 * | 12/2022 | Roh | G06Q 40/08 |
| 2023/0001871 | A1 * | 1/2023 | Neubauer | H04L 67/12 |
| 2023/0122572 | A1 * | 4/2023 | Choi | H04W 4/90 455/404.1 |
| 2023/0166743 | A1 | 6/2023 | Heck et al. | |
| 2023/0169845 | A1 * | 6/2023 | Turner | G06Q 40/08 455/404.1 |
| 2023/0211780 | A1 | 7/2023 | Tanaka et al. | |
| 2023/0242099 | A1 * | 8/2023 | Pishehvari | B60W 30/06 340/932.2 |
| 2023/0282350 | A1 * | 9/2023 | Devore | G16H 50/30 705/2 |
| 2023/0298468 | A1 | 9/2023 | Jha et al. | |
| 2024/0089701 | A1 * | 3/2024 | Motoyama | H04W 4/029 |
| 2024/0169296 | A1 * | 5/2024 | Watfa | G06Q 10/06393 |

FOREIGN PATENT DOCUMENTS

| | | | |
|---|---|---|---|
| JP | 2015504616 | A | 2/2015 |
| JP | 6940612 | B2 | 9/2021 |
| JP | 7470486 | B2 | 4/2024 |
| WO | 2019028349 | A1 | 2/2019 |
| WO | 2022201639 | A1 | 9/2022 |

OTHER PUBLICATIONS

Kumeda et al. "Classification of road traffic accident data using machine learning algorithms." 2019 IEEE 11th international conference on communication software and networks (ICCSN). IEEE, 2019. (Year: 2019).

Santo et al. "Machine learning approaches to traffic accident analysis and hotspot prediction." Computers 10.12 (2021): 157. (Year: 2021).

Wang, Junhua, et al. "Modeling when and where a secondary accident occurs." Accident Analysis & Prevention 130 (2019): 160-166. (Year: 2019).

* cited by examiner

AUTOMATIC VEHICLE ACCIDENT NOTIFICATIONS WITHIN A DISTRIBUTED NETWORK OF RECIPIENTS

TECHNICAL FIELD

The present disclosure is directed to automatically generating and issuing notifications of a vehicle accident to entities selected using characteristics of the vehicle accident.

BACKGROUND

A variety of urgent needs often must be addressed when a vehicle accident occurs. For example, such needs can include providing medical assistance to individuals impacted by the accident, assessing resulting property damage in a vicinity of the accident, and ensuring the orderly flow of traffic around the accident. To meet these needs, it is necessary to know as much information about the accident as is possible and to then filter that information so that relevant entities can be notified.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
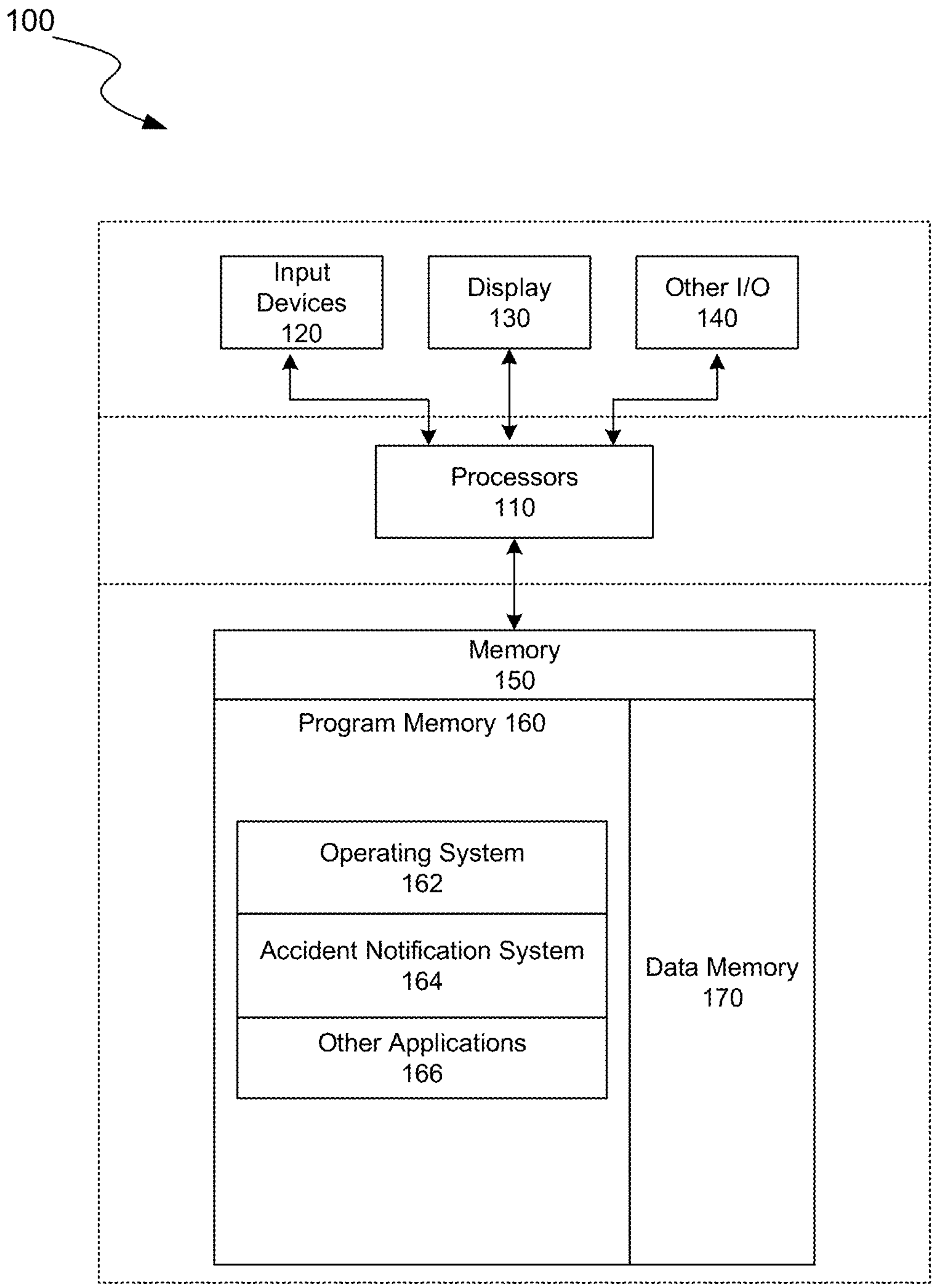
FIG. 1 is a block diagram illustrating an overview of devices on which some implementations can operate.

Aspects of the present disclosure are directed to automatically generating and issuing notifications of a vehicle accident to entities selected using characteristics of the vehicle accident. An accident notification system can retrieve accident information (or data) for a vehicle accident occurrence from an individual, vehicle, and/or device involved in the vehicle accident occurrence, where the individual has permissioned the release of one or more types of data. Using the retrieved data, the accident notification system can implement a machine learning model to determine accident characteristics for the vehicle accident occurrence. The accident notification system can then apply a mapping of the accident characteristics to notification parameters to determine parameters for notifications of the vehicle accident occurrence. The parameters can define one or more entities which ought to receive notifications of the vehicle accident occurrence. For example, the entities can include individuals with certain emergency skills, such as doctors, nurses, emergency medical technicians (EMTs), police and fire personnel, etc. who have chosen to respond to accidents and are or will be in a vicinity of the vehicle accident occurrence. The entities can further include an emergency medical services (EMS) system. Still further, the entities that can receive one or more notifications of the vehicle accident occurrence can include other drivers disposed at, or moving in a direction toward, the vehicle accident occurrence. Additionally, the entities can include utilities and insurers of property which may have been impacted by the vehicle accident occurrence. Once having made appropriate entity selections in accordance with corresponding parameters for the notifications, the accident notification system can then issue appropriate entity-specific notifications to the selected entities. In this regard, exemplary notifications can include requests for medical services, requests to reroute from the site of the vehicle accident occurrence, requests to gather additional accident data for the vehicle accident occurrence, etc.

The accident notification system can retrieve data indicating a vehicle accident occurrence, as provided by an individual, a vehicle, and/or a device involved in the occurrence. The data provided by the individual can include, for example, images taken at the scene of the vehicle accident occurrence and/or a description for the accident scene that can be provided in written form, a spoken account that is later reduced to writing, selections of options (e.g., check-boxes in a user interface), etc. In some implementations, the aforementioned device can include a telecommunications and/or computing device such as a cellular telephone or laptop computer, and/or a wearable for the individual. Data that can be provided by the vehicle and/or the device can be data that the individual has opted to divulge, and which can be automatically retrieved by the accident notification system. Such data can include, for example, sensor data defining one or more aspects of motion or absence thereof, positioning, lighting, fluid status, temperature, humidity, precipitation, tire pressure, audio (both internal and external to the vehicle(s))—to include timeline prior to, during, and after the accident signal). Such data can further include imaged data which can, for instance, be captured by one or more camera systems of the vehicle during its operation—such camera systems as may capture one or more electromagnetic bands (e.g. visible, infrared, ultraviolet). Data that can be provided by the wearable can further include biometric data including eye movement, blood pressure, heart rate, heart rate variability, sleep status, blood glucose and rate of change in blood glucose, and overall movement (e.g., from an IMU unit e.g., momentum, rotation, etc.) The accident notification system can conclude that a vehicle accident has actually occurred in accordance with accident detection techniques described in commonly owned U.S. patent application Ser. No. 17/560,489, filed Dec. 23, 2021, entitled, "Method and System for Automatedly Detecting a Vehicle Accident," the entire contents of which are hereby incorporated by reference.

In some implementations, the accident notification system can implement a machine learning model on the retrieved data to determine characteristics for the vehicle accident occurrence. The characteristics can include, for example, bodily injury, property damage, damage to one or more utilities in a vicinity of the vehicle accident occurrence, whether the vehicle accident occurrence created a road hazard, i.e., blocked traffic conditions, roadway debris, a particular fire event for which specialized response may be necessary (e.g., lithium sourced explosion, smoke, burning oil, gas, or coolant), fuel leakage, etc. Each of the characteristics can be determined to be associated with a corresponding severity level. For instance, determined severity levels of the characteristics can be rated as minimal, moderate, or severe depending on an extent of injury, damage, or traffic obstruction, etc.

In some implementations, the machine learning model can be trained to match the retrieved accident data for a vehicle accident occurrence to one or more characteristics for the occurrence. The machine learning model can be trained using training data where the one or more characteristics are determined from a history of vehicle accident circumstances and events recorded by emergency response records, hospital records (including but not limited to radiographic and/or other diagnostic examination (e.g. MRI/fMRI DICOM, CT/DICOM, X-Ray, EMG, PET), prior insurance claims records, manual data tagging, personal medical histories (either via Electronic Medical Records Integration or manually where authorized by patient for disclosure), utility company records, etc. That is, the training data can include matching pairs of prior accident data to one or more determined accident characteristics, where the pairs are a result of a comparison between a type of the prior accident data for a prior vehicle accident occurrence and conclusions, observations, or outcomes of, for example, a prior insurance claim. For example, the training data defining a given model can be normalized for a particular individual or groups of individuals to leverage pre-existing medical condition records in order to enhance the probability for a match between accident data and characteristics for an accident. As another example, the training data defining a model can be segmented to be particularized for a given medical condition (e.g., bone breakage, diabetes, pre-existing conditions indicative of a certain type of bodily injury as a matched characteristic). Each pair of prior accident data and determined accident characteristic(s) can be applied to a model, with the accident data provided as input, predicted accident characteristics compared to the actual accident characteristics, and, based on the comparison, model parameters updated thereby training the model.

Once the model has been trained, it can be used to generate characteristics for retrieved accident data of a vehicle accident occurrence. An exemplary listing of the characteristics can include "injury occurred," "created road hazard," "utilities damaged," "property damaged," "consciousness indicator" (as may be triggered by sensors in smart glasses or in a vehicle monitoring system), "hemodynamic compromise," an accident location, types of vehicles involved, forces incurred in the accident, ongoing dangers (e.g., fire, chemical spill, etc.), number of vehicles, vehicle types, or people involved, etc. The accident notification system can then determine parameters for selecting who should be notified and features of the notifications by applying a mapping of accident characteristics to notification parameters. For example, in a case of hemodynamic compromise, such features can include routing to a trauma facility as opposed to a conventional emergency room (ER).

For example, types of notifications can include, for example, an injury occurred notification, a created road hazard notification, a utilities damaged notification, and a property damaged notification. In this regard, the notification parameters can specify a particular type of entity that ought to be notified for a generated characteristic and its corresponding severity level. For example, the parameters can specify a specialized notification entity (e.g., medevac helicopter versus traditional ambulance, hazmat equipment, etc.)

Further, the notification parameters can specify that the entity be near or on a travel trajectory toward a location of the vehicle accident occurrence. For example, if the characteristic is "severe injury occurred," the accident notification system can determine that one or more entities with emergency skills (hereinafter "accident responders"), are appropriate recipients depending upon their location status. More specifically, the notification parameter can specify that such entities include public service professionals as well as private individuals who have opted-in to responding to accidents and are nearby or approaching the scene of the vehicle accident occurrence where injury occurred. Still further, the notification parameter can specify that such entities include an emergency medical services (EMS) system.

As another example, if the characteristic is "created road hazard," the accident notification system can determine the appropriate notification is a notification which should be issued to other drivers whose location or travel trajectory is in a direction toward the location of a vehicle accident occurrence causing the road hazard. In some implementations, the notification can be implemented using one of a multitude of communication methods, e.g., vehicle to vehicle (V2V) communication(s) or automatic push notification. In some implementations, other appropriate notifications can be notifications to a governmental agency, such as a police department, fire department, traffic management authority, etc.

As yet another example, if the characteristic is "utilities damaged," the accident notification system can determine that it would be appropriate to notify utility companies providing services within, for instance, a predetermined radius of a vehicle accident occurrence, of the accident location and a type of suspected or known damage. Data for determining the characteristic and a corresponding notification can include specialized data that can indicate a type of the utility damage for which a corresponding type of response is appropriate. For example, the data can include imaging derived from a vehicle or other device capturing a downed utility pole for which an appropriate notification could be dispatched to a pole inspection and replacement unit. As another example, the data can include electromagnetic field (EMF) sensor data derived from the vehicle or other device and which indicates a voltage range of power sources in proximity to the accident occurrence. In this case, an appropriate notification can be provided to a power line specialist designated for response. As yet another example, the data can include vehicle sensor data indicative of contact with a power source (e.g., breaker outage, erratic voltage/current patterns, etc.), whereas a notification can designate one or more specialized electrical teams as appropriate responders for the vehicle accident occurrence.

Additionally, if the characteristic is "property damaged," the accident notification system can determine that the appropriate notification is a notification to any insurance company known to provide coverage in the area encompassing the site of a vehicle accident occurrence. Specifically, the notification here can include the accident location and a type of injury and/or property damage. In particular, such a notification can be particularized for the location and an affected real property owner by using, for example, a geographic information system (GIS) mapping for relevant property records. This way, the notification can be transmitted directly to the real property owner as soon as damage is detected or suspected. In some implementations, another appropriate notification can be a notification to one or more insurance companies known to have a service coverage area for the accident location and the affected real property.

In some implementations, the mapping of the accident characteristics to notification parameters can limit the selection of a given notification parameter according to a severity level of an accident characteristic. That is, in order for a characteristic to be able to be mapped to a notification parameter, the severity level of the characteristic can be required to meet or exceed a predetermined threshold. For example, the accident notification system can require that notifications to accident responders are only appropriate for injuries rated as moderate or severe. In contrast, the accident notification system can issue notifications to an EMS system as to any level of injury. As another example, the accident notification system can require that notifications to other drivers due to a created road hazard should only be issued if the hazard is severe.

After having determined the appropriate one or more parameters for sending accident notifications, the accident notification system apply the one or more parameters to select the specific entities that will receive the notifications. The selections can be performed, for instance, by using location data that accident responders and other drivers have permitted accident notification system to access. For example, the accident notification system can use such location data in instances in which notifications for injury occurrence or creation of a road hazard have been identified. This way, a doctor and drivers, for example, who are either in or approaching a vicinity of a vehicle accident occurrence can be alerted appropriately. The accident notification system can further cross-reference location data obtained from a driver and/or devices involved in a vehicle accident occurrence to service coverage area data pertaining to utility companies and property insurance providers. In doing so, the accident notification system can use the results of the cross-referencing to identify the relevant companies for which accident notifications for the vehicle accident occurrence can be issued.

Following identification of the specific entities to receive notifications of a vehicle accident occurrence, the accident notification system can issue accident notifications corresponding to the generated accident characteristics and selected parameters. For example, the accident notifications can be one or more of (a) a request for assistance issued to accident responders that are or will be in a vicinity of a vehicle accident occurrence, (b) an advisory issued to drivers in a vicinity of a vehicle accident occurrence to, for example, reroute, slow down, or change lane, (c) a request to drivers that are or will be in a vicinity of a vehicle accident occurrence to report additional information for the accident, (d) an advisory to an EMS system conveying the location of a vehicle accident occurrence and types of resulting injury and/or property damage, (e) an advisory to an insurance company conveying the location of a vehicle accident occurrence and observed damage, in which the insurance company is known to provide insurance coverage for an area encompassing the location of the vehicle accident occurrence, and (f) an advisory to a utility company conveying the location of a vehicle accident occurrence and types of suspected or known equipment damage due to the accident, in which the utility company is known to provide service for an area encompassing the location of the vehicle accident occurrence. The accident notification system can, for example, have notification templates for various types of entities, and can fill in the templates based on the generated accident characteristics.

Existing manners for providing urgently needed awareness of a vehicle accident and its impact(s) have largely been a function of separately sourced notifications. For example, it is often the case when a vehicle accident occurs that a multitude of different individuals each separately notify an emergency medical services (EMS) system, relevant insurance providers, and affected utilities to report circumstances for the accident. These separately sourced notifications can introduce a number of impediments affecting an ability to deliver an appropriate response for the vehicle accident. For example, accuracy of the accident data can be diminished due to an injection of subjective conclusions about conditions at the location of the vehicle accident. This can be the case particularly when a bystander at the scene of a vehicle accident believes that a utility has been impacted when, in fact, it has not. As another example, having to manually report information for the vehicle accident, whether to EMS or another entity, for example, can introduce a lag in time that can delay appropriate medical care and other types of assistance that would be commensurate with and optimal for a given level of injury (e.g., medevac helicopter versus traditional ambulance depending on type and seriousness of injury and distance to medical facility). Yet further, accident notifications can be limited to being delivered to only EMS systems, while other potentially impacted entities such as other drivers, utility owners, other individual who could help, etc., are not notified.

In contrast, implementations of the accident notification system according to the present technology provide a singular point for both automated receipt of accident data and distributions of notifications corresponding to accident characteristics for that data. In particular, the accident notification system can implement the automatic retrieval of accident data for a vehicle accident occurrence which is fed to a machine learning model to accurately identify the corresponding accident characteristics. As such, opportunities for subjective determination about conditions at the scene of a vehicle accident, which can lead to faulty accident data, is removed. Furthermore, the accident notification system can expeditiously and accurately distribute multiple notifications of a vehicle accident to a variety of entities which are defined by a mapping of accident characteristics to notification parameters. This way, it can be possible for entities such as EMS to be notified as soon as the accident data is received and processed by the accident notification system. Advantageously, such processing can lead to the issuance of accident notifications perhaps even before a driver of an affected vehicle or bystander has the opportunity to initiate her own notification(s). Further, these notifications can be delivered to a wider variety of recipients who have connected to the accident notification system, e.g., through text, email, mobile device push notifications, device infotainment systems, etc. Accordingly, the accident notification system of the present technology can generate and issue accident notifications for a vehicle accident occurrence in manners which can overcome the above-described deficiencies of existing systems.

Several implementations are discussed below in more detail in reference to the figures. FIG. 1 is a block diagram illustrating an overview of devices on which some implementations of the disclosed technology can operate. The devices can comprise hardware components of a device 100 that automatedly generates and issues notifications of a vehicle accident within a distributed network of recipients. Device 100 can include one or more input devices 120 that provide input to the Processor(s) 110 (e.g. CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, accident notification system 164, and other application programs 166. Memory 150 can also include data memory 170, e.g., investigative accident data, accident severity measurement data, emergency response reports data, hospital records data, historical insurance claims records data, insurance company service coverage area data, utility company records data, utility company service coverage area data, accident notification recipient location data, accident notification parameter data, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
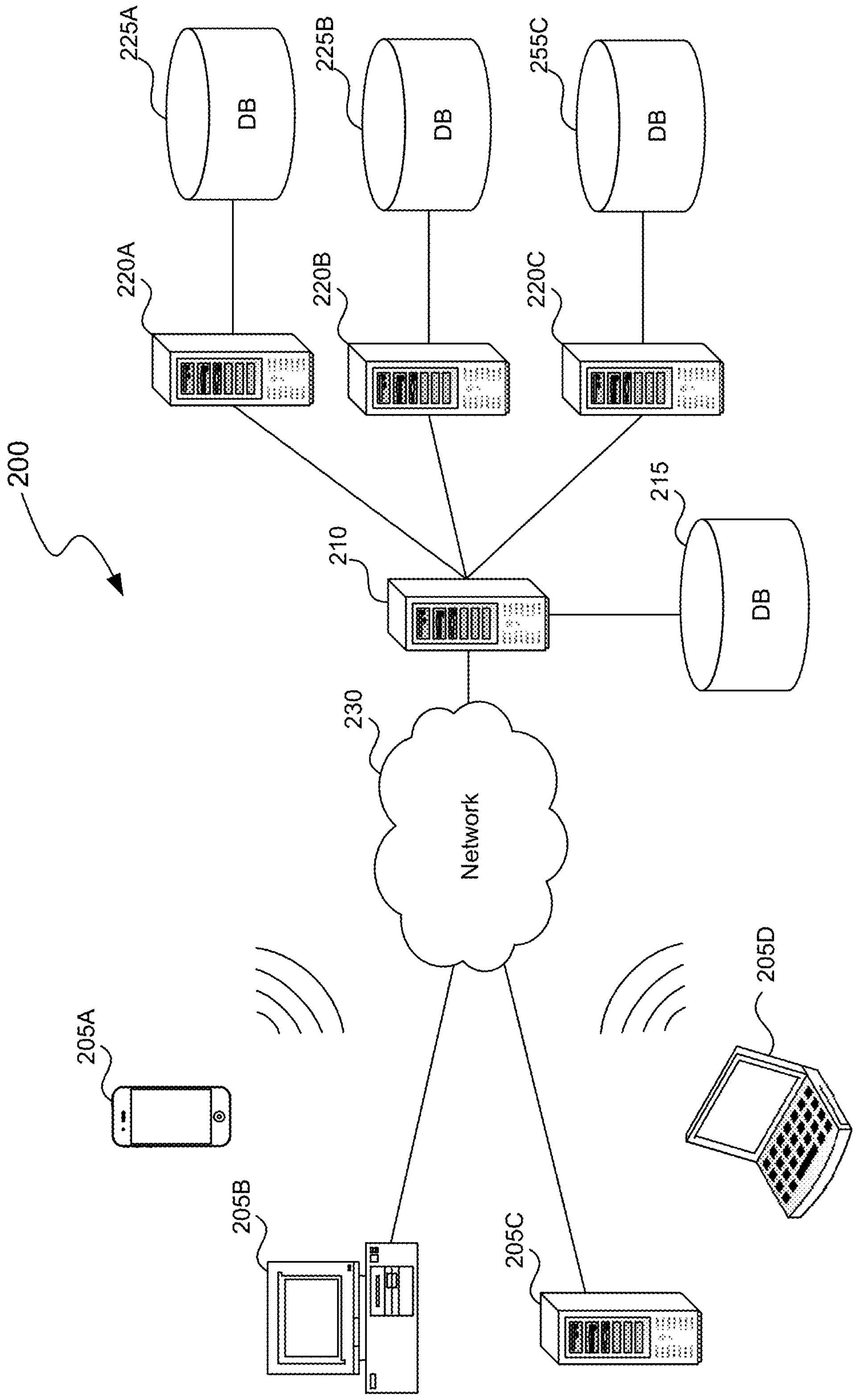
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information such as investigative accident data, accident severity measurement data, emergency response reports data, hospital records data, historical insurance claims records data, insurance company service coverage area data, utility company records data, utility company service coverage area data, accident notification recipient location data, and accident notification parameter data that may be on a database for the accident notification system 164. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
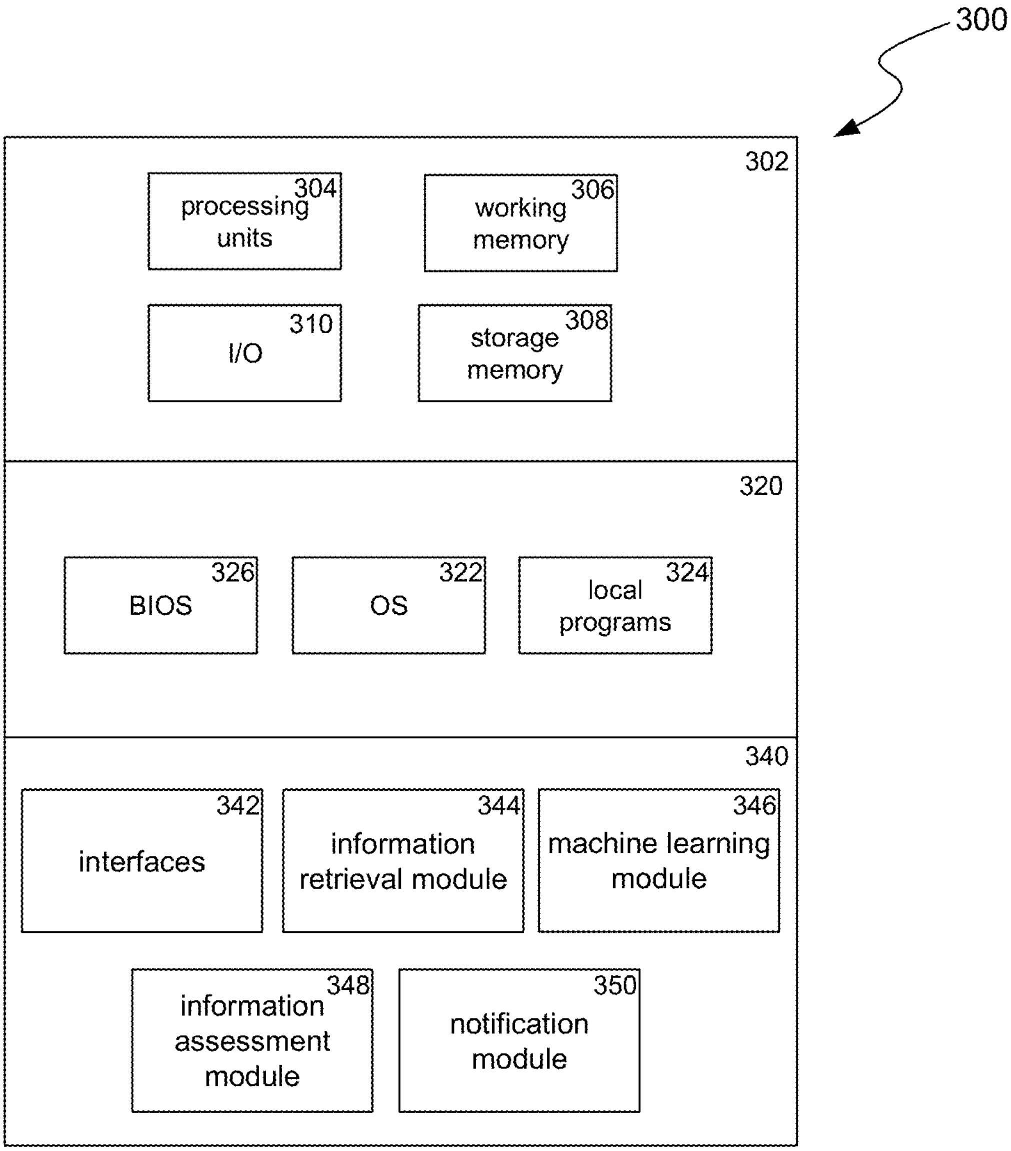
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include an information retrieval module 344, a machine learning module 346, an information assessment module 348, a notification module 350, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

In some implementations, information retrieval module 344 can retrieve accident data provided by an individual involved in a vehicle accident occurrence, the vehicle itself, a computing and/or communications device, and/or any sensing device used or worn by the individual. Such retrieval can occur in response to the individual personally transmitting accident data. In a case in which accident data is to be retrieved from either the vehicle or one or more of the noted devices, retrieval can occur continuously or during one or more time periods, depending on the conditions for release of the data. Additional details on retrieving accident data are provided in relation to block 502 of FIG. 5.

In some implementations, machine learning module 346 can intake accident data from the information retrieval module 344 to determine accident characteristics for a vehicle accident occurrence. To carry out the determination, machine learning module 346 can convert accident data to machine learning model input. The machine learning module 346 can then apply the accident data to a trained machine learning model that can then generate the accident characteristics. Additional details on the generation of accident characteristics are provided in relation to blocks 504, 506, and 508 in FIG. 5.

In some implementations, information assessment module 348 can, using the generated characteristics from machine learning module 346, apply a mapping of one or more of those accident characteristics to one or more notification parameters, i.e., types of notifications including, for example, an injury occurred notification, a created road hazard notification, a utilities damaged notification, and a property damaged notification. That is, one or more characteristics may interrelate such that they can be mapped to a same parameter or multiple, different parameters, where the parameters can specify particular entities as recipients for accident notifications of a vehicle accident occurrence. In this regard, information assessment module 348 can implement the mapping to require that a severity level of the characteristic to be mapped meets or exceeds a predetermined threshold. Information assessment module 348 can assess a severity level for a generated characteristic by comparing it to a severity level of a corresponding prior characteristic (e.g., a severe injury as recorded in a prior insurance claim record). Additional details on applying a mapping of accident characteristics to notification parameters are provided in relation to block 510 in FIG. 5.

In some implementations, information assessment module 348 can, using the mapping of accident characteristics to notification parameters, further select individual ones of parameter specified entities which can be recipients of accident notifications. More particularly, the types of recipients defined by the notification parameters can be used to select the specific ones of those entities most likely to need a notification of the accident. For example, the notification parameters can specify that a type of entity including nearby drivers should be notified, and thus information assessment module 348 can determine whether accident responders and other drivers are in a vicinity of a vehicle accident occurrence by comparing their location to a current location for those entities. If their location indicates a current or upcoming proximity, information assessment module 348 can select one or more of the entities as recipients of accident notifications for the vehicle accident occurrence. As another example, where the notification parameters specify that a type of entity is a utility that should be notified, information module 348 can determine which specific utility company has equipment (e.g., gas lines, electrical lines, water piping, etc.) in the area or which company's service coverage area includes the accident location to be selected as recipients of accident notifications. Additional details on selecting notification recipients are provided in relation to block 512 in FIG. 5.

In some implementations, notification module 350 can receive the entities selected by information assessment module 348, and transmit one or more accident notifications of the vehicle accident occurrence to those entities. For example, the accident notifications can be one or more of (a) a request for assistance issued to accident responders that are at or have a travel trajectory toward a location of a vehicle accident occurrence, (b) an advisory issued to drivers who have a travel trajectory toward a location of a vehicle accident occurrence to, for example, reroute, slow down, or change lane, (c) a request to drivers that are or will be in a vicinity of a vehicle accident occurrence to report additional information for the accident, (d) an advisory to emergency medical services conveying the location of a vehicle accident occurrence and types of resulting injury and/or property damage, (e) an advisory to an insurance company conveying the location of a vehicle accident occurrence and observed injury and/or damage, and (f) an advisory to a utility company conveying the location of a vehicle accident occurrence and types of suspected or known damage due to the accident. For example, each notification type can have a defined template that notification module 350 can fill with details of the selected recipients and accident characteristics. Additional details on providing accident notifications are discussed in relation to block 514 in FIG. 5.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
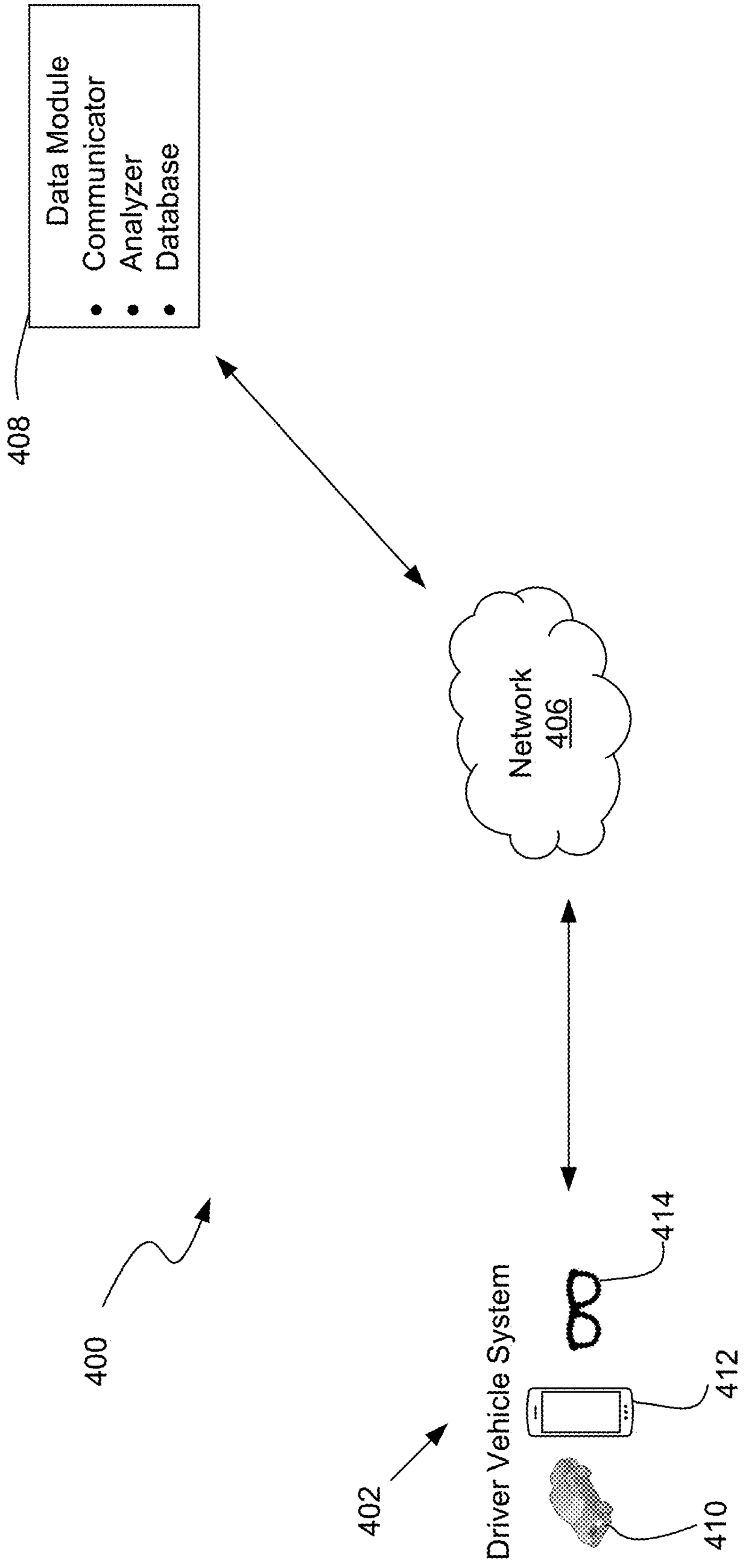
FIG. 4 is a conceptual diagram illustrating a flow of accident data from multiple information sources to a back-end data module that can be used in some implementations for detecting a vehicle accident occurrence for which accident notifications are to be provided.

FIG. 4 is a conceptual diagram illustrating a flow 400 of accident data from multiple information sources to a back-end data module that can be used in some implementations for detecting a vehicle accident occurrence for which accident notifications are to be provided. The information sources can include those of a vehicle driver system 402, and more particularly, systems of a vehicle 410, a computing and/or communications device 412, and/or a wearable 414, such as a smart watch or smart glasses. Accident data to be provided by each of the above sources can be communicated through a network 406, which can be similar to network 230 of FIG. 2, to a back-end data module 408. The module 408 can be implemented according to the components of FIG. 3 to comprise a communicator, an analyzer, and a database. The communicator can coordinate push/pull communications from the vehicle system 402 and the analyzer can analyze data of the communications in accordance with implementations of the disclosed technology.

The vehicle 410, device 412, and/or wearable 414 can provide a myriad of data that can be used by accident notification system 164 (hereinafter "notification system 164") to detect a vehicle accident occurrence and then generate one or more accident notifications. Such data, as well as data that may be personally provided to the notification system 164 by an individual involved in a vehicle accident occurrence, can define investigative accident data that can be used to detect the occurrence and its location.

Accordingly, in some implementations, investigative accident data that can be obtained from the vehicle 410 can include sensor data which can be sourced from any of sensors of the vehicle 410, including, for example, proximity/distance sensors (e.g., Light Detection and Ranging (LiDAR)), an included inertia measuring unit (IMU), weight and pressure sensors as may be respectively disposed in seating and a steering wheel, speed sensors, acceleration and braking system sensors, accessory charging system sensors, as well as from any sensors included in location/navigation systems. Such investigative accident data can further include images captured by one or more of imaging systems which may be included by the vehicle 410. In some implementations, investigative accident data that can be obtained from the communications device 412 can include, for example, sensor data indicative of positioning and/or acceleration. In some implementations, such sensor data can also be indicative of, for example, ambient lighting, moisture, and barometric pressure. In some implementations, investigative accident data that can be obtained from the wearable 414 can include biometric data including eye movement and/or configuration change (e.g., pupil dilation), blood pressure, heart rate measurement(s), sleep status, blood glucose measurement(s), brain wave measurement(s) and overall movement from an IMU unit, e.g., forces, orientation, rotation, etc., (as may occur during seizure, for example). In some implementations, one or more of the vehicle 410, the communications device 412, and the wearable 414 can provide investigative data sourced from one or more respectively included chemical sensors configured to detect gaseous or other bodily discharge. In some implementations, investigative accident data can be defined by a comparison between one or more types of data obtained from one or more of vehicle 410, communications device 412, and wearable 414. That is, notification system 164 can derive comparison data which can provide further investigative accident data for a vehicle accident occurrence.

Figure 5:
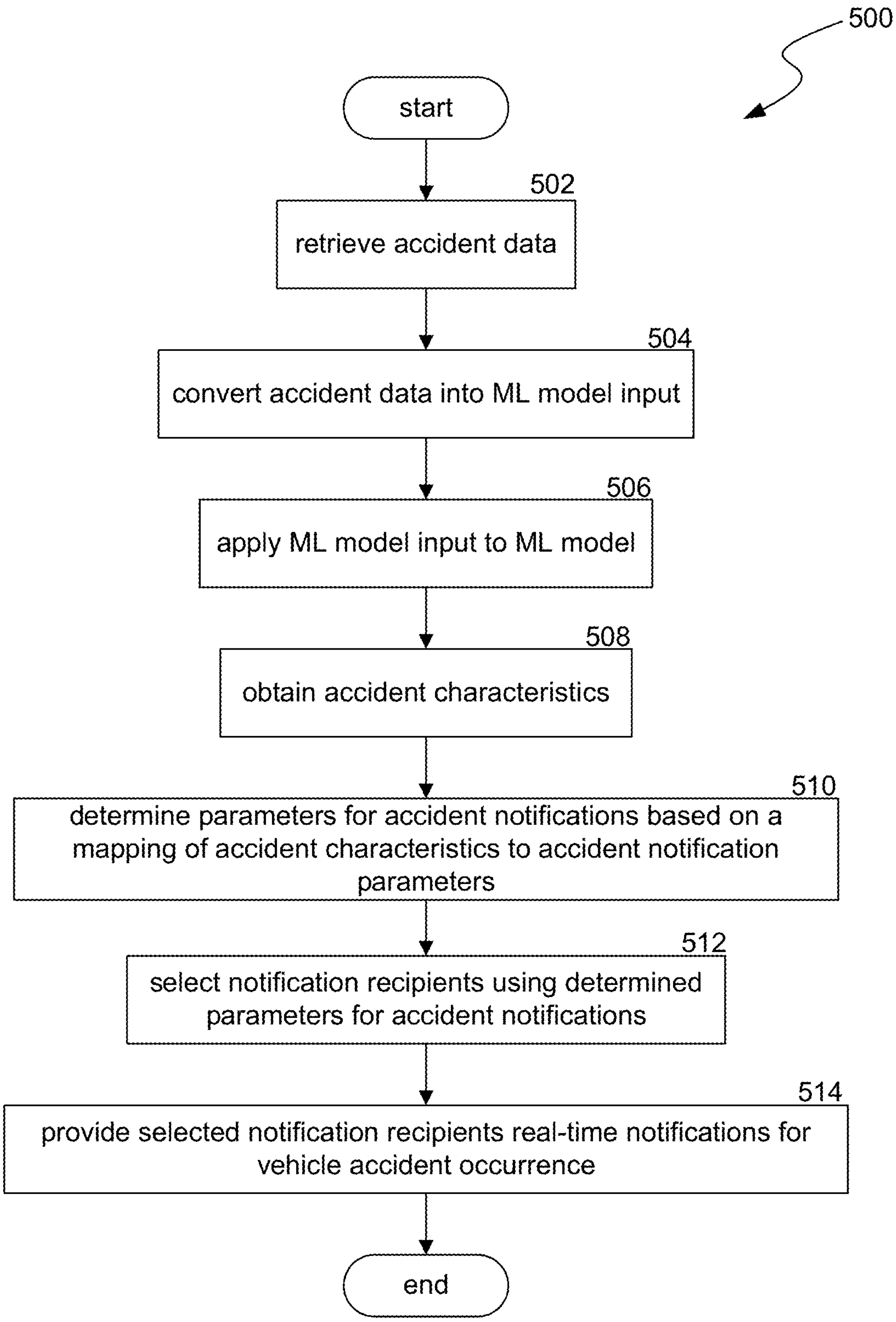
FIG. 5 is a flow diagram illustrating a process used in some implementations for determining accident characteristics of a vehicle accident occurrence, and then automatedly generating and issuing notifications to one or more entities selected as notification recipients in accordance with the characteristics.

FIG. 5 is a flow diagram illustrating a process 500 used in some implementations for determining accident characteristics of a vehicle accident occurrence. Using the characteristics, process 500 can then automatedly generate and issue notifications to one or more entities selected as notification recipients in accordance with the characteristics. Process 500 can be initiated by a driver signing up for the accident notification service as implemented, for example, via the components of FIG. 3, with respect to a given vehicle 410. Process 500 can be performed whenever the notification system 164 has received investigative data of the driver and/or a passenger (who has likewise signed up for the accident notification service) during operation of the given vehicle 410. Alternatively or in addition, process 500 can be performed whenever the notification system 164 has received investigative data from any source, other than a driver and/or a passenger, who has permissioned its collection. For example, the investigative data can be received from one or more other vehicles and/or individuals at the scene of a vehicle accident occurrence.

At block 502, notification system 164 can be configured to receive accident data, i.e., the investigative data discussed above in relation to FIG. 4, for a suspected vehicle accident occurrence. For example, the investigative data can include receipt of a phone call or a text message, data provided via an app on a mobile device, etc., describing an accident scene involving the driver and/or the passenger. The investigative data can further or alternatively include data of a movement profile for the vehicle 410 as determined, for instance by the vehicle's IMU, as well other sensor data of the vehicle 410. Still further or alternatively, the investigative data can include sensory data provided by a wearable 414 of the driver and/or the passenger, as well as that of any computing or communications device 412 included in the vehicle 410. When in receipt of one or more of the above types of data, notification system 164 can perform an analysis, which can include one or more comparisons as between different investigative data, to determine an occurrence for a vehicle accident involving vehicle 410. Additional details on detecting a vehicle accident occurrence are provided in commonly owned U.S. patent application Ser. No. 17/560,489, filed Dec. 23, 2021, entitled, "Method and System for Automatedly Detecting a Vehicle Accident," the entire contents of which are hereby incorporated by reference.

After having confirmed that the investigative data demonstrates a vehicle accident occurrence, process can, at block 504, convert such accident data into machine learning model input. For example, the machine learning model can be configured to receive a sparse vector with vector slots filled by the various types of data received at block 502. Values for an insurance claims record, and other portions of the investigative data, can be entered into a vector that the machine learning model has been trained to receive. The vector can be a sparse vector in which the values can represent, for example, photographs and/or video images from a vehicle accident occurrence, sensor readings, vehicle movement profiles (such as may occur upon a vehicle impacting a utility pole), descriptions of the accident, etc.

At block 506, process 500 can apply the machine learning model input generated at block 504 to a machine learning model trained to identify characteristics for the accident data. A "machine learning model" or "model" as used herein, refers to a construct that is trained using training data to make predictions or provide probabilities for new data items, whether or not the new data items were included in the training data. For example, training data for supervised learning can include positive and negative items with various parameters and an assigned classification. Examples of models include: neural networks (traditional, deeps, convolution neural network (CSS), recurrent neural network (RNN)), support vector machines, decision trees, decision tree forests, Parzen windows, Bayes, clustering, reinforcement learning, probability distributions, decision trees, and others. Models can be configured for various situations, data types, sources, and output formats.

The machine learning model can be trained with supervised learning and use training data that can be obtained from a history of vehicle accident circumstances and events recorded by emergency response records, hospital records, prior insurance claims records, manual data tagging, and utility company records, etc. More specifically, each item of the training data can include an instance of a prior vehicle accident matched to one or more accident characteristics. The matching can be performed according to a predetermined algorithm configured to receive accident data (e.g., movement patterns, images from an accident, car sensor data) from a historical record and pair it with results of analysis of the record, such as what types of injury and/or property damage occurred, what types of road hazards were created (e.g., blocked traffic, debris field, fuel leakage, fire), what utilities were affected and how, etc. For example, prior records can show and/or describe instances of down power equipment, a broken gas line, flooding, etc. During the model training, a representation of the accident data (e.g., histograms of the images, values representing sensor readings, semantic embeddings of claimant descriptions of an accident, etc.) can be provided to the model (e.g., each as an element of a vector). Then, the output from the model, i.e., predicted characteristics from the model, can be compared to the actual matched characteristics from the accident and, based on the comparison, the model can be modified, such as by changing weights between nodes of the neural network or parameters of the functions used at each node in the neural network (e.g., applying a loss function). After applying each of the pairings of the inputs (prior accident data) and the desired outputs (accident characteristics) in the training data and modifying the model in this manner, the model is trained to evaluate new instances of accident data in order to determine characteristics for a vehicle accident occurrence.

At block 508, process 500 can obtain, from the model, predicted accident characteristics. An exemplary listing of characteristics that process 500 can determine can include "injury occurred," "created road hazard," "utilities damaged," "property damaged," an accident location, types of vehicles involved, forces incurred in the accident, ongoing dangers (e.g., fire, chemical spill, etc.), number of vehicles or people involved, etc. As previously discussed, the characteristics can include confirmation that an injury occurred and a corresponding injury severity level. Here, the model can be trained to identify and output the severity level by comparison to like injuries demonstrated by prior historical records. Further examples of the characteristics can include property damage severity, damage to one or more utilities in a vicinity of the vehicle accident occurrence and a severity level, whether the vehicle accident occurrence created a road hazard, i.e., blocked traffic conditions, roadway debris, fire, fuel leakage, etc.

At block 510, process 500 can determine parameters for accident notifications of the vehicle accident occurrence involving vehicle 410. In particular, process can make the determination by applying a mapping of the predicted characteristics generated by the machine learning model to accident notification parameters for a vehicle accident occurrence. In this regard, the accident notification parameters can be accessible to process 500 and predetermined as to a combination of one or more of the generated characteristics. This way, process 500 can implement information assessment module 348, to match the generated characteristics to appropriate accident notification parameters. The notification parameters can specify A) a particular type of entity that ought to be notified for B) a generated characteristic and its corresponding severity level. The notification parameter can specify that such entities include public service professionals as well as private individuals who have opted in to responding to accidents and are nearby or approaching the scene of the vehicle accident occurrence where the injury occurred. Still further, process can determine that an EMS system is an appropriate notification entity for any level of injury. As another example, if the characteristic is "created road hazard," a corresponding parameter for an accident notification can be a notification which should be issued to other drivers whose location or travel trajectory is in a vicinity of a vehicle accident occurrence causing the road hazard. Additionally, another parameter for notification can be a notification to a traffic management authority administering traffic control resources (traffic signals, etc.) in a vicinity of a vehicle accident occurrence. Another parameter for notification for this characteristic can be a notification to an appropriate governmental authority (police, EMS, and/or fire department, etc.) depending on a type of the road hazard (e.g., presence of nuclear, pathogenic, explosive, flammable, carcinogenic material, etc.). As yet another example, if the characteristic is "utilities damaged," a corresponding parameter for an accident notification can be a notification to utility companies providing services within, for example, a predetermined radius of a vehicle accident occurrence. Additionally, if the characteristic is "property damaged," a corresponding parameter can be a notification to any insurance company known to provide coverage in the area encompassing the site of a vehicle accident occurrence. In particular, a parameter for notification can be a notification particularized for the location and an affected real property by using, for example, a geographic information system (GIS) mapping for relevant property records. This way, the notification can be transmitted to the relevant one or more insurance companies providing coverage for an owner of that real property.

At block 512, process 500 can select notification recipients corresponding to the parameters for accident notifications determined at block 510. The notification parameters are search parameters for selecting entities that match those parameters—such as emergency responders within a threshold distance, qualified medical professionals who have opted in to help for accidents and are on a travel trajectory toward the accident, utility companies that have equipment near the accident or a service area including the accident, insurance companies insuring property affected by the accident, etc. For example, some of the notification parameters can specify that the entity be near or on a travel trajectory toward a location of the vehicle accident occurrence. As a more specific example, if the accident characteristic is "severe injury occurred," the accident notification system can determine that the parameters should include one or more accident responders depending upon their location status and, for example, a type of resources possessed by the responders for addressing the injury (e.g., trauma skills). Then to select specific accident responders, process 500 can assess, a current location and travel trajectory of accident responders and/or other drivers with respect to the location of the vehicle accident occurrence. Using that assessment, process 500 can evaluate whether such entities are or will be sufficiently proximate to the location of the vehicle accident occurrence to warrant selection as a notification recipient. Process 500 can deem presence or future arrival of the entities within a predetermined radius of the location of the vehicle accident occurrence as being sufficient for selection as a notification recipient. Relatedly, process 500 can evaluate proximity of specialized facilities (trauma facilities, for example) and select such facilities as notification recipients. That is, process 500 can correlate the type of responder selected to respond to an injury with a facility that can intake and care for such injury. Process 500 can assess, service coverage areas of, for example, insurance companies and utility companies with respect to the location of the vehicle accident occurrence by using mapping system provided by the utility companies. That is, process 500 can, for a generated accident characteristic mapped to a corresponding notification parameter, deem it appropriate to select respective ones of those companies as notification recipients.

At block 514, process 500 can provide selected accident notification recipients real-time notifications for the vehicle accident occurrence, where the notifications are designated for those entities. That is, process 500 can use the investigative accident data collected by data module 408 to confirm that a vehicle accident has occurred, and in response, automatically initiate transmission of designated, i.e., entity-specific, accident notifications. Such designated notifications can include, for example, a request to a doctor for injury assistance, a request for particular type of repair unit (of a utility company, for example), a suggested lane change to another driver, etc. In this regard, exemplary accident notifications are discussed below in relation to FIG. 6B. Process 500 can generate one or more of such notifications according to a variety of presentation and delivery formats. For example, process 500 can pre-fill a template which is applicable to a given entity, e.g., accident responder or EMS, with accident details including location and injury type(s) with corresponding severity levels. Process 500 can generate notifications by filling (based on the accident data and characteristics) a pre-defined template and deliver notifications in the form of one or more of an email, a text message, a push notification, and an automated telephone call providing an audio only alert, a wearable device (e.g., artificial reality device), etc. Alternatively or in addition, entities can receive notifications via an alert transmitted to a vehicle's heads-up display (HUD), infotainment or audio system. In a case in which the alert concerns a road hazard, process 500 can deliver automated changes in driving directions, e.g., updated routing or suggested lane change—e.g., to a navigation system. Process 500 can continue to transmit the discussed notifications until they have been acknowledged by the intended recipient, whether another driver, 911 system, traffic management authority, police and/or fire department, utility company, etc. Process 500 can further distribute the accident location and an estimated time of arrival (ETA) of responders to the accident location among all responders. This way, for example, response efforts can be effectively coordinated. For example, process 500 can coordinate the response efforts by distributing notifications among all responding entities as to which entities are confirmed as respondents to the accident.

In some implementations, notifications can be delivered over existing networks (e.g., cell towers, satellite uplinks, etc. to reach the internet for delivery). In other implementations, the system can establish a mesh network or distributed ledger for notifications. For example, an encrypted propagation mesh network can be established where vehicles propagate and re-propagate signals detected for a given time span (many to many) or until the designated recipient verifies receipt—allowing transmission over an ad-hoc mesh style network. The notification can reach recipients (e.g., EMS, Police, other responders, etc. over the propagation mesh). With a distributed ledger, notifications can be written to the blockchain, which then computes the commit to the full chain.

Figure 6A:
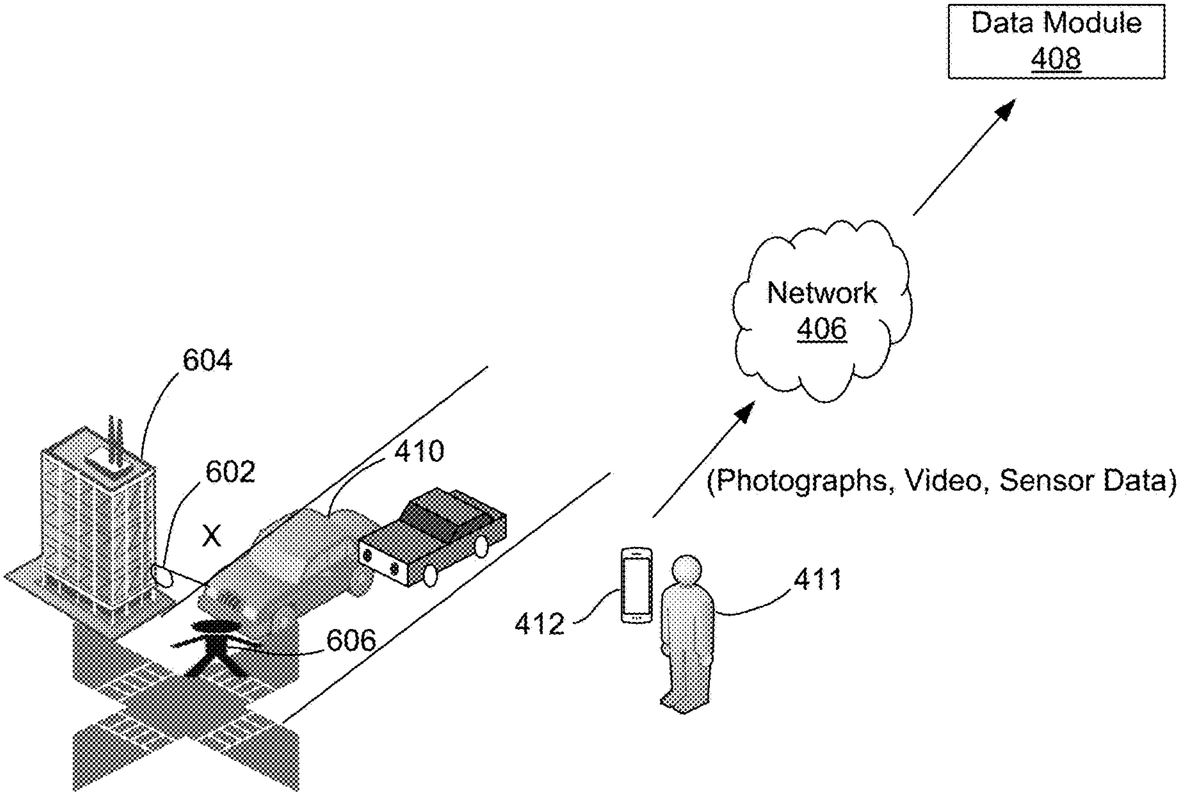
FIG. 6A shows a pictorial representation of the collection of accident data for a vehicle accident occurrence.

FIG. 6A shows a pictorial representation of the collection of accident data for a vehicle accident occurrence. Therein, a vehicle accident has occurred at location "X" (555 Clarke Rd.) More specifically, vehicle 410 has been involved in a rear-end collision. Effects of the collision include impact to utility pole 602 causing it to sway into nearby building 604. The collision has also caused vehicle 410 to strike pedestrian 606.

In response to the vehicle accident and after relocating to a safe area, driver 411 is shown reporting the accident data, through uploading of the accident data from her communications device 412 to data module 408, via network 406. In particular, the accident data includes photographs, video, and sensor data of the communications device 412. Although not shown, data module 408 further collected sensor data originated from vehicle 410, which notification system 164 used to initially detect the subject vehicle accident.

Figure 6B:
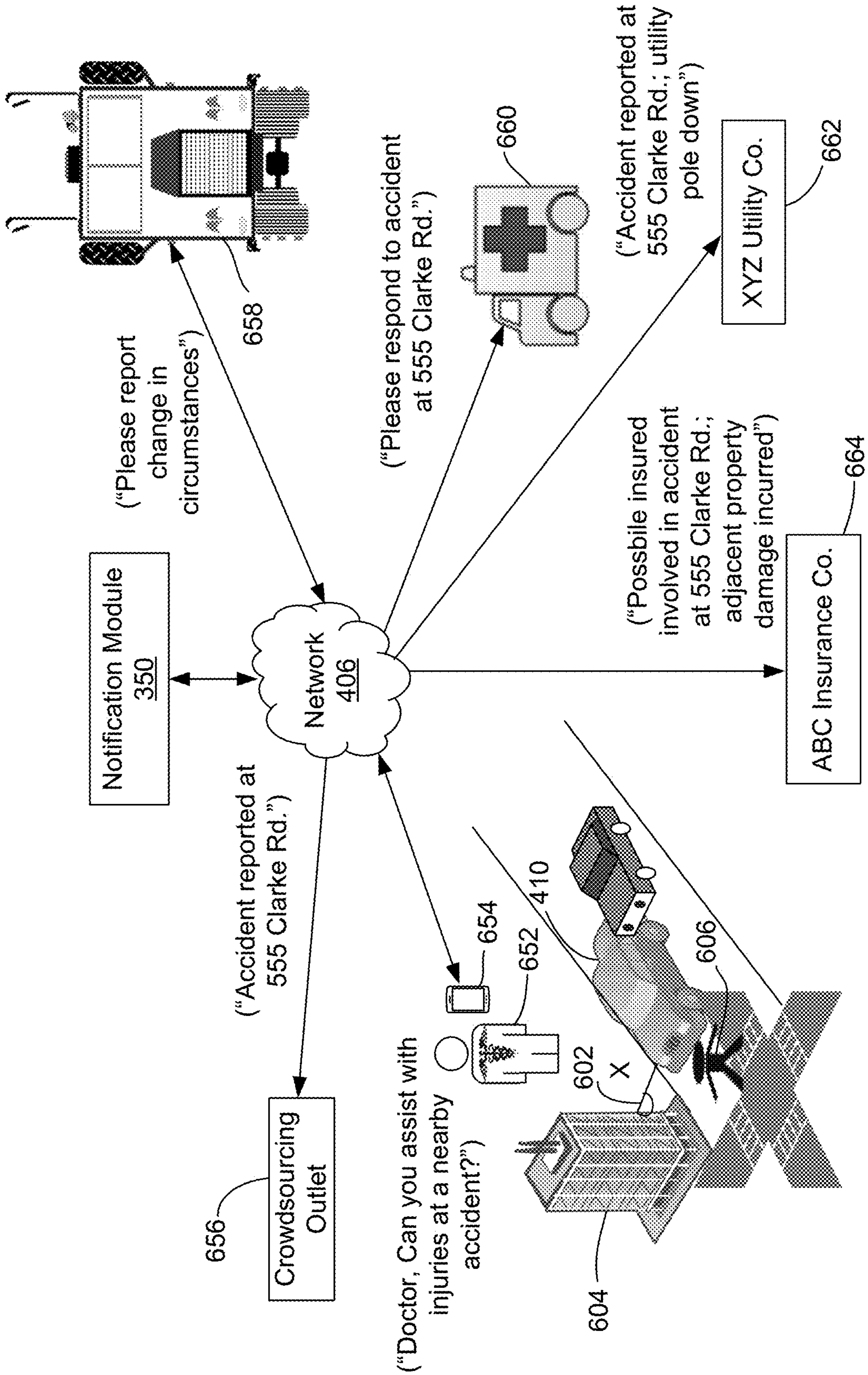
FIG. 6B shows a pictorial representation of entities selected to receive indicated accident notifications regarding the vehicle accident occurrence of FIG. 6A.

FIG. 6B shows a pictorial representation of entities selected to receive indicated notifications regarding the vehicle accident occurrence of FIG. 6A. The indicated notifications reflect the previously discussed mapping of predicted accident characteristics and their corresponding severity levels to notification parameters for a vehicle accident occurrence. Here, notification system 164, through implementation of process 500, determines that the nature of the collision has caused severe damage to pedestrian 606, building 604, and utility pole 602. Accordingly, notification system 164 proceeds to transmit corresponding notifications for the collision at 555 Clarke Rd. to each of the depicted entities.

For example, notification system 164 is implemented to query a doctor 652 who had been determined to be in a vicinity of 555 Clarke Rd. according to GPS data permissioned from the doctor's communication device 654. In particular, the relevant notification inquires whether the doctor can assist with injuries that can be verified by notification system 164. That is, notification system 164 can verify the injuries and their severity level using a comparison of sensor data received from the vehicle 410 and the accident data retrieved from driver 411. Additionally, notification system 164 has issued a request for EMS 660 to respond to the accident location since injury to at least pedestrian 606 occurred. For example, and as discussed with respect to implementations of the present technology, notification system 164 can issue such a request for a particularized form of EMS, such as a medevac helicopter.

Notification system 164 has further communicated a relevant accident notification reporting the vehicle accident occurrence to crowdsourcing outlet 656 in order for that entity to be able to alert other drivers in a vicinity of the accident location. This way, such other drivers can reroute away from the accident location or exercise other appropriate caution when approaching the accident location. Additionally, notification system 164 has notified the relevant traffic management authority so that appropriate traffic management control at and around the accident location can be implemented (e.g., flashing of caution lighting and roadway alert messaging advising of the accident).

As also shown, notification system 164 has transmitted a notification to a trucking entity determined to be in the vicinity of the subject accident according to received, permissioned GPS data. Such entity can be selected when its coordinate location relative to the accident location would allow for the gathering of additional information for the vehicle accident occurrence. For instance, the trucking entity enjoys a heightened visual perspective relative to the roadway surface that can allow reporting of any traffic obstruction transverse to the adjacent intersection.

Since building 604 had been impacted by the toppling of utility pole 602, and given the potential that the striking vehicle is covered by automobile insurance, notification system 164 can use service coverage area data for a plurality of insurance companies to issue an accident notification. In this case, notification system 164 has determined that ABC Insurance Co. 664 provides both property and automobile coverage for the building 604 and vehicle 410. Accordingly, notification system 164 can transmit the shown notification advising of the accident location and damage for the vehicle 410 and building 604.

Additionally, notification system 164 can also use known service coverage area data for a plurality of utility companies to determine whether a particular one of those companies may have been impacted by a vehicle accident occurrence. Here, notification system 164 can determine that the location of the subject accident is encompassed by the service coverage area for XYZ Utility Co. 662; thus, the system can transmit the shown notification advising of the accident location. That is, notification system 164 can advise the utility of the location of the vehicle accident occurrence and a type of suspected damage, i.e., a toppled utility pole 602 causing electrical outage(s). This may include additional details such as identified pole type, length, type of fracture, material (e.g., wood, fiberglass, metal, etc.), whether the pole has mounted transformers and/or transformer line ceramic standoffs, transformer/pole base serial numbers, visuals of the damage, markers uniquely associated to the electrical pole (e.g., RFID, Visual Tags, Bar Codes, QR, NFC-signal, etc.). In some cases, utility notifications can allow the utility to perform remote-de-activation of the damaged utility, reducing the risk of further damage.

Figure 7:
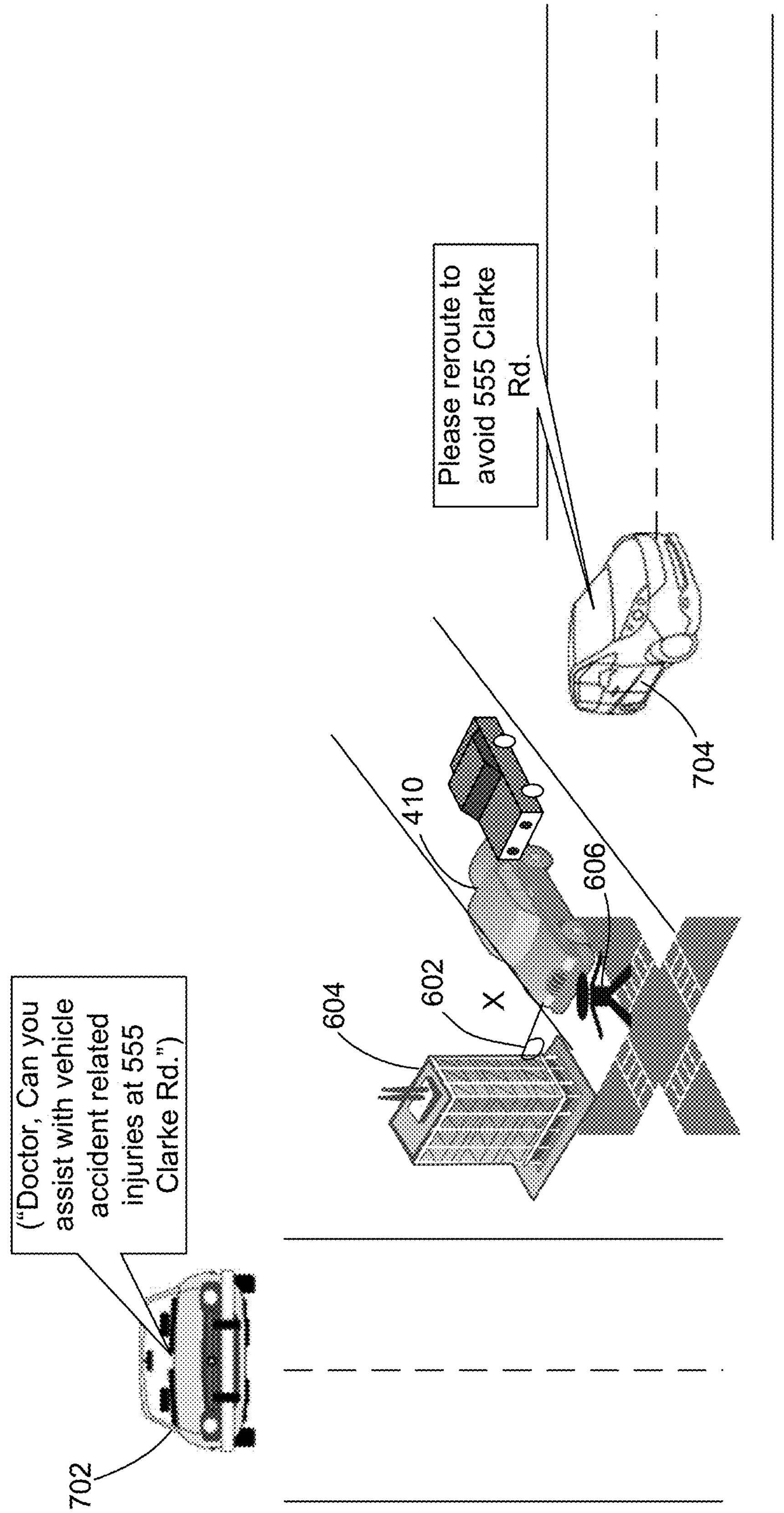
FIG. 7 shows a pictorial representation of manners in which selected entities of FIG. 6B can receive their relevant accident notifications.

FIG. 7 shows a pictorial representation of manners in which selected entities of FIG. 6B can receive their relevant accident notifications. In this regard, it is contemplated that each of the accident notifications addressed herein can be efficiently received by a respective recipient while driving. For example, vehicle 704 can be equipped to receive notifications via pairing of a recipient's telecommunications device with its infotainment system. This way, the recipient can perceive the notifications as she would any other type of broadcast material. As another example, vehicle 706 can be equipped to receive notifications via the recipient's telecommunications device for display on a wirelessly linked or otherwise integrated heads-up display (HUD). Similarly, therefore, the recipient can perceive notifications just as she would other information, such as driving speed, etc.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method of automatedly generating notifications of a vehicle accident occurrence, the method comprising:

receiving accident data indicating a vehicle accident occurrence for a vehicle, wherein the accident data comprises recorded data from a device associated with the vehicle accident occurrence;

converting the recorded data into input for a machine learning model;

applying the input to the machine learning model and, in response, obtaining characteristics for the vehicle accident occurrence;

based on a mapping of the characteristics for the vehicle accident occurrence to notification parameters, determining at least a type of entity to receive accident notifications; and providing one or more real-time notifications of the vehicle accident occurrence designated for the type of entity, wherein the type of entity selected to correspondingly receive accident notifications comprise a utility company, and wherein the one or more real-time notifications indicate utility equipment damage caused by the vehicle accident occurrence.

2. The method of claim 1, wherein the notification parameters define types of accident notifications; and wherein the one or more of the characteristics for the vehicle accident occurrence are mapped to the types of accident notifications according to a severity level of the one or more characteristics meeting or exceeding a predetermined severity threshold.

3. The method of claim 1, wherein the one or more of the real-time notifications provided to the utility company comprises the location of the vehicle accident occurrence and a type of injury and/or damage.

4. The method of claim 1, wherein the characteristics for the vehicle accident occurrence further comprise a road hazard caused by the vehicle accident occurrence, and a further type of entity selected to correspondingly receive accident notifications of the vehicle accident occurrence comprises a driver of another vehicle disposed in a direction toward a location of the vehicle accident occurrence; and wherein one or more of the accident notifications provided to the selected driver of the other vehicle comprise driving directions defining routing in a direction away from the location of the vehicle accident occurrence.

5. The method of claim 1, wherein at least one of the real-time notifications for the vehicle accident occurrence is provided to the selected one or more entities via (a) a vehicle heads-up display (HUD), (b) an alert transmitted to a vehicle infotainment system, (c) an audio only alert emitted by a telecommunications device or vehicle audio system, or (d) an automated update causing a change to driving directions or a suggested lane change.

6. A computing system for automatedly generating notifications of a vehicle accident occurrence, the computing system comprising:

one or more processors; and one or more memories storing instructions that, when executed by the one or more processors, cause the computing system to perform a process comprising:

receiving accident data indicating a vehicle accident occurrence for a vehicle, wherein the accident data comprises recorded data from a device associated with the vehicle accident occurrence;

converting the recorded data into input for a machine learning model;

applying the input to the machine learning model and, in response, obtaining characteristics for the vehicle accident occurrence;

based on a mapping of the characteristics for the vehicle accident occurrence to notification parameters, determining at least a type of entity to receive accident notifications;

wherein the type of entities selected to correspondingly receive accident notifications of the vehicle accident occurrence comprise a utility company; and providing one or more notifications of the vehicle accident occurrence designated for the selected type of entity, wherein the one or more notifications indicate utility equipment damage caused by the vehicle accident occurrence.

7. The computing system of claim 6, wherein the notification parameters define types of accident notifications; and wherein the one or more of the characteristics for the vehicle accident occurrence are mapped to the types of accident notifications according to a severity level of the one or more characteristics meeting or exceeding a predetermined severity threshold.

8. The computing system of claim 6, wherein the characteristics for the vehicle accident occurrence further comprise an injury caused by the vehicle accident occurrence, and a further type of entity selected to correspondingly receive accident notifications of the vehicle accident occurrence comprises:

an accident responder disposed in a direction of a location of the vehicle accident occurrence, or an emergency medical services (EMS) system; and wherein one or more of the accident notifications provided to the accident responder or EMS system comprises a location of the vehicle accident occurrence and either or both of a request for assistance with the injury or a type of injury and/or damage.

9. The computing system of claim 8, wherein the accident responder was selected to receive accident notifications of the vehicle accident occurrence due to a determined severity level of the injury having met or exceeded a predetermined severity level threshold.

10. The computing system of claim 6, wherein the characteristics for the vehicle accident occurrence comprise a road hazard caused by the vehicle accident occurrence, and a further type of entity selected to correspondingly receive accident notifications of the vehicle accident occurrence comprises a driver of another vehicle disposed in a direction toward a location of the vehicle accident occurrence; and wherein one or more of the accident notifications provided to the selected driver of the other vehicle comprise driving directions defining routing in a direction away from the location of the vehicle accident occurrence.

11. The computing system of claim 6, wherein at least one of the real-time notifications for the vehicle accident occurrence is provided to the selected one or more entities via (a) a vehicle heads-up display (HUD), (b) an alert transmitted to a vehicle infotainment system, (c) an audio only alert emitted by a telecommunications device or vehicle audio system, or (d) an automated update causing a change to driving directions or a suggested lane change.

12. A non-transitory machine-readable storage medium having machine-executable instructions stored thereon that, when executed by one or more processors, cause the one or more processors to perform a method for automatedly generating notifications of a vehicle accident occurrence, the method comprising:

receiving accident data indicating a vehicle accident occurrence for a vehicle, wherein the accident data comprises recorded data from a device associated with the vehicle accident occurrence;

converting the recorded data into input for a machine learning model;

applying the input to the machine learning model and, in response, obtaining characteristics for the vehicle accident occurrence, wherein the characteristics for the vehicle accident occurrence comprise utility equipment damage caused by the vehicle accident occurrence;

based on a mapping of the characteristics for the vehicle accident occurrence to notification parameters, determining parameters for accident notifications defining at least a type of entity to receive accident notifications of the vehicle accident occurrence;

wherein the type of entities selected to correspondingly receive accident notifications of the vehicle accident occurrence comprise a utility company; and providing one or more notifications of the vehicle accident occurrence designated for the type of entity, wherein one or more of the accident notifications provided to the utility company comprises a location of the vehicle accident occurrence and a suspected or known type of utility equipment damage caused by the vehicle accident occurrence.

13. The non-transitory machine-readable storage medium of claim 12, wherein the characteristics for the vehicle accident occurrence further comprise an injury caused by the vehicle accident occurrence, and a further type of entity selected to correspondingly receive accident notifications of the vehicle accident occurrence comprises:

an accident responder disposed in a direction of a location of the vehicle accident occurrence, or an emergency medical services (EMS) system; and wherein one or more of the accident notifications provided to the accident responder or EMS system comprises a location of the vehicle accident occurrence and either or both of a request for assistance with the injury or a type of injury and/or damage.

14. The non-transitory machine-readable storage medium of claim 13, wherein the accident responder was selected to receive accident notifications of the vehicle accident occurrence due to a determined severity level of the injury having met or exceeded a predetermined severity level threshold.

15. The non-transitory machine-readable storage medium of claim 12, wherein the characteristics for the vehicle accident occurrence comprise a road hazard caused by the vehicle accident occurrence, and a further type of entity selected to correspondingly receive accident notifications of the vehicle accident occurrence comprises a driver of another vehicle disposed in a direction toward a location of the vehicle accident occurrence; and wherein one or more of the accident notifications provided to the selected driver of the other vehicle comprise driving directions defining routing in a direction away from the location of the vehicle accident occurrence.

16. The non-transitory machine-readable storage medium of claim 12, wherein at least one of the real-time notifications for the vehicle accident occurrence is provided to the selected one or more entities via (a) a vehicle heads-up display (HUD), (b) an alert transmitted to a vehicle infotainment system, (c) an audio only alert emitted by a telecommunications device or vehicle audio system, or (d) an automated update causing a change to driving directions or a suggested lane change.

* * * * *